United States Patent [19]

Tucker

[11] 4,231,468
[45] Nov. 4, 1980

[54] COAL-GATHERING ASSEMBLY FOR A CONTINUOUS MINER

[76] Inventor: Dempsey G. Tucker, 600 E. Oak St., Mascoutah, Ill. 62258

[21] Appl. No.: 879,353

[22] Filed: Feb. 21, 1978

[51] Int. Cl.³ .............................................. B65G 65/16
[52] U.S. Cl. .................................... 198/515; 198/518; 299/68
[58] Field of Search ............... 198/518, 515, 512, 519, 198/722, 723, 624; 37/113, 43 K; 299/68, 64, 67

[56] References Cited

U.S. PATENT DOCUMENTS 2,406,976  9/1946  Waltz et al. ........................... 198/515

FOREIGN PATENT DOCUMENTS 517593  2/1940  United Kingdom ..................... 198/515

Primary Examiner—Robert B. Reeves
Assistant Examiner—Douglas D. Watts
Attorney, Agent, or Firm—Cohn, Powell & Hind

[57] ABSTRACT

A coal-gathering assembly for a continuous miner in which a platform is disposed behind a rotatable cutter, and a coal-transporting conveyor is located adjacent the platform for delivering coal rearwardly of the miner. The assembly includes a base plate rotatively mounted on the platform on each side of the coal-transporting conveyor. A plurality of bars are carried by each base plate, each bar extending across its associated base plate intermediate the rotative axis of the base plate and the base plate periphery. Each bar has one end adjacent the next angularly adjacent bar and has the other end extending beyond the base plate periphery. Each angularly adjacent pair of bars provide a substantially inwardly closed pocket. More particularly, each bar extends across the base place and is spaced from and intermediate the rotative axis and the base plate periphery, and extends substantially transverse to a radial line passed through the rotative axis and intermediate the ends of the bar. Each bar includes a leading edge facing in the direction of base plate rotation and extending substantially between its ends, and includes a trailing edge facing in the opposite direction and extending outwardly from the leading edge of the next angularly adjacent bar. The leading edge of each bar pushes the coal outwardly onto the conveyor as the associated base plate rotates.

9 Claims, 4 Drawing Figures

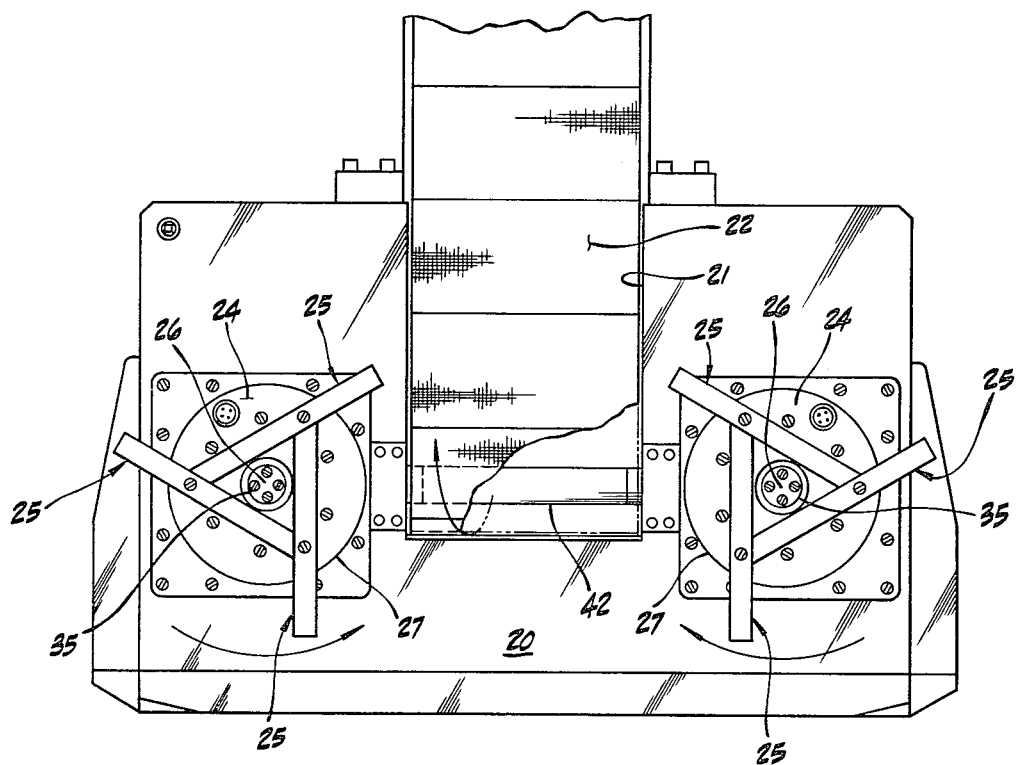
FIG. 2.
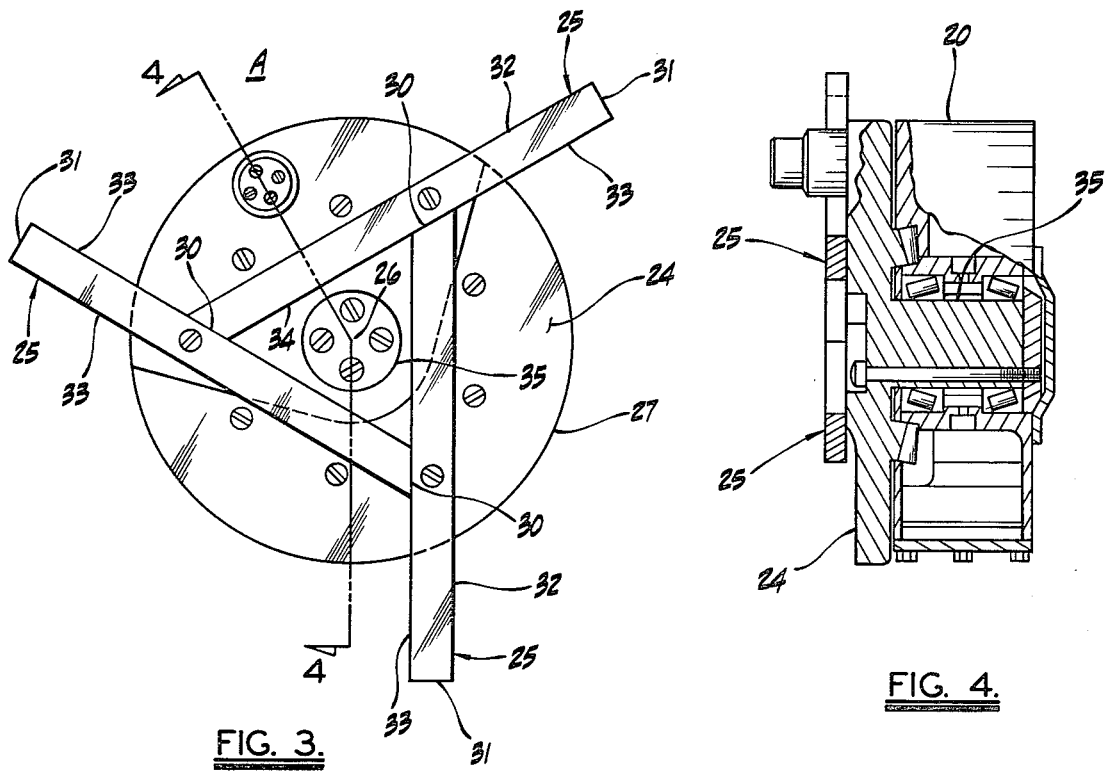
FIG. 3.
FIG. 4.

COAL-GATHERING ASSEMBLY FOR A CONTINUOUS MINER

BACKGROUND OF THE INVENTION

This invention relates generally to a coal-gathering assembly for a continuous miner, and more particularly, to an improved assembly for collecting and transferring coal onto a conveyor that delivers the coal rearwardly of the miner.

In the heretofore conventional continuous miner having coal-gathering arms at the front at each side of an intervening conveyor, the arm is pivotally journaled on a bearing fixed to and rotatable with a wheel, and is pivoted to a link that is in turn pivoted to a platform. Upon rotation of the wheel, the bearing rotates with the wheel and moves the arm in a substantially circular path toward and away from the conveyor so that the arm pushes the coal inwardly onto the conveyor. This assembly utilizes expensive and wearable bearings and seals that must be periodically replaced, and thereby results in frequent shut-downs in the use of the miner.

In other prior units, rotatable wheels with projecting bars at opposite sides of a conveyor for gathering coal and loading the coal onto the conveyor, have been used. Because of the structural arrangement of these projecting bars, the delivery of coal onto the conveyor is highly inefficient.

SUMMARY OF THE INVENTION

The present coal-gathering assembly eliminates most of the expensive and wearable bearings and seals, connecting links and arms of the heretofore conventional coal-gathering assembly in a continuous miner. As a result, the assembly is less expensive to manufacture and maintain, and results in very few interruptions in the use of the miner because of service maintenance of the assembly. Moreover, the present coal-gathering assembly with its particular structural arrangement of bars is highly efficient in collecting the coal and transferring the coal onto the miner conveyor.

In the present coal-gathering assembly, a plurality of bars are carried by a rotatively mounted base plate, each bar extending across the base plate so that one bar end is adjacent the next angularly adjacent bar and the other bar end extends beyond the periphery of the base plate. Each angularly adjacent pair of bars provide a substantially inwardly closed pocket that holds the coal. With this structural arrangement, each bar effectively and efficiently pushes the coal laterally outward as the base plates rotate.

More particularly, in the assembly, each bar extends across the base plate intermediate and spaced from a rotative axis of the base plate and the base plate periphery.

The bearing means, rotatively mounting the base plate on the rotative axis, is located inwardly of and between the bars for access to the bearing means incident to service maintenance.

The coal-gathering assembly is for a continuous miner having a platform located behind a rotatable cutter means, and having a coal-transporting conveyor adjacent the platform for delivering coal rearwardly of the miner. The assembly includes a base plate rotatively mounted on the platform at each side of the conveyor. A plurality of bars are carried by each base plate, each bar extending across its associated base plate intermediate the rotative axis of the base plate and the base plate periphery, and each bar having one end adjacent the next angularly adjacent bar and having the other end extending beyond the base plate periphery. With this structural arrangement, each angularly adjacent pair of bars provides a substantially inwardly closed pocket, and each bar effectively and efficiently pushes the coal outwardly onto the conveyor as the base plate rotates.

To provide effective and efficient operation of the bars in the assembly, each bar extends across the base plate and is spaced from and intermediate the rotative axis and base plate periphery, and extends substantially transverse to a radial line passed through the rotative axis and intermediate the ends of the bar.

Each bar includes a leading edge facing in the direction of base plate rotation and extending substantially between its ends, and includes a trailing edge facing in the opposite direction and extending outwardly from the leading edge of the next angularly adjacent bar. The leading edge is longer in length than the trailing edge. The leading edge of one bar and the trailing edge of the next angularly adjacent bar provides the pocket. The long leading edge of each bar located in its particular juxtaposition with the rotative axis and the base plate periphery, effectively pushes the coal outwardly onto the conveyor as the base plates rotate.

BRIEF DESCRIPTION OF THE DRAWING

FIG. 2 is a top plan view of a coal-gathering assembly in the miner;

FIG. 3 is an enlarged top plan view of the coal-gathering assembly, and

FIG. 4 is a fragmentary, enlarged cross-sectional view taken on staggered line 4—4 of FIG. 3.

DESCRIPTION OF THE PREFERRED EMBODIMENT

Figure 1:
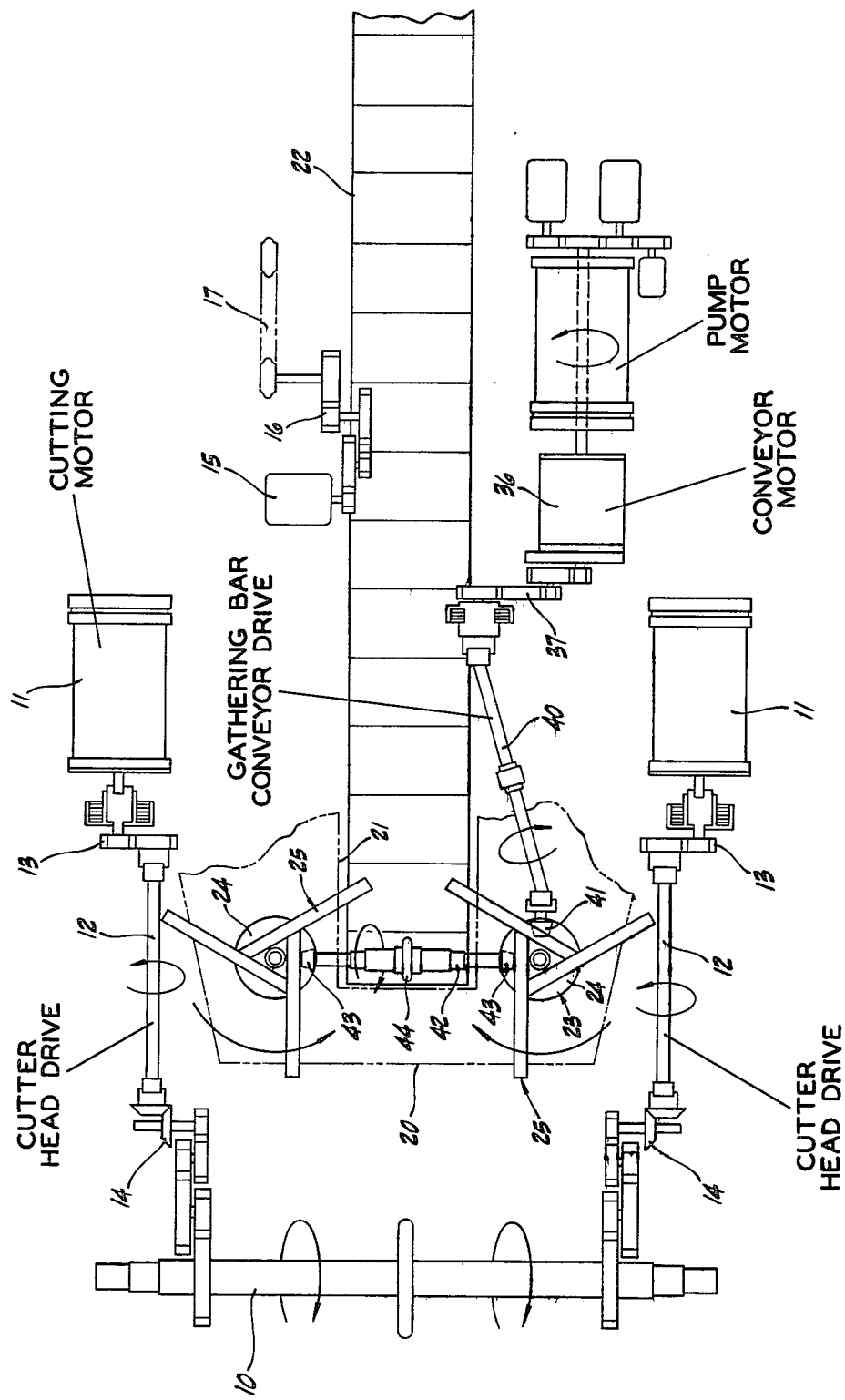
FIG. 1 is a fragmentary diagram of the pertinent component parts of a continuous miner.

Referring now by characters of reference to the drawings, and first to FIG. 1, it will be understood that the continuous miner includes a conventional cutter head (not shown) rotatively mounted on and by a transverse shaft 10 at the front of the miner. A pair of cutting motors 11 operate through associated cutter head drives to rotate the transverse shaft 10. The cutter head drives each includes a drive shaft 12 rotated by motor 10 through gearing 13, the drive shaft 12 rotating the transverse shaft 10 through gearing 14.

The miner is powered so that it can be moved along the mine floor. The traction drive for the miner includes a motor 15 connected by gearing 16 and chain drive 17 to a wheel or caterpillar tread (not shown).

A platform 20 is located at the front of the miner behind and below the cutter head so that the coal cut by the cutter head is moved up and onto the platform 20. The platform 20 is provided with a rear recess 21 that receives the front end of an elongate conveyor 22, constituting a coal-transporting means. The conveyor 22 extends rearwardly from the platform 20, and serves to deliver the coal behind the miner.

Mounted on the platform 20, is a coal-gathering assembly generally indicated by 23. As is best shown in FIGS. 2 and 3, the coal-gathering assembly 23 includes a base plate 24 rotatively mounted on the platform 20 at each side of the conveyor 22. A plurality of bars referred to by 25 are carried by each base plate 24. Preferably, the bars 25 are welded or otherwise secured to the top surface of base plate 24. These bars 25 are made from top grade steel, and are approximately two inches wide and four inches high. Each bar 25 extends across its associated base plate 24 intermediate the rotative axis 26 of the base plate 24 and the base plate periphery 27. Each bar 25 has one end 30 adjacent the next angularly adjacent bar and the other end 31 extending beyond the base plate periphery 27. Each angularly adjacent pair of bars provides a substantially inwardly closed pocket radially offset from the rotative axis 26.

More particularly, it will be understood that each bar 25 extends across the base plate 24 and is spaced from and intermediate the rotative axis 26 and the base plate periphery 27, and extends substantially transverse to a radial reference line A passed through the rotative axis and intermediate the ends of the bar 25.

Each bar 25 includes a leading edge 32 facing in the direction of base plate rotation and extending substantially between its ends 30 and 31, and includes a trailing edge 33 facing in the opposite direction and extending outwardly from the leading edge of the next angularly adjacent bar 25. The leading edge 32 is substantially longer in length than the trailing edge 33. The leading edge 32 of one bar 25 and the trailing edge 33 of the next angularly adjacent bar 25 provides the pocket. With this particular structural arrangement of the bars, the leading edge 32 of each bar 25 effectively and efficiently pushes the coal outwardly onto the conveyor 22 as the associated base plate 24 rotates.

In the preferred embodiment, three bars 25 are provided on each base plate 24, the three bars 25 being arranged in substantially one hundred and twenty degree relation. The three bars 25 define an enclosed triangular space 34 at the center of the base plate 27 and coincident with the rotative axis 26.

A bearing means indicated by 35 rotatively mounts each base plate 24 to the platform 20 on the rotative axis 26. The bearing means 35 is located inside the enclosed space 34 defined by the associated bars 25. The space 34 is open at the top for access to the bearing means 35 for service and maintenance.

The drive for the coal-gathering assembly 23 includes a motor 36 connected by gearing 37 to a drive shaft 40. The drive shaft 40 rotates a drive gear 41 that meshes with and turns gearing such as a ring gear (not shown) carried by the underside of the base plate 24, whereby to rotate the base plate 24. A cross drive shaft 42 extends between and operatively interconnects the base plates 24 at opposite sides of the conveyor 22 by gears 43 meshing with suitable ring gears (not shown).

A drive sprocket 44 carried on and drivingly connected to the cross shaft 42 is operatively connected by any suitable conventional means, such as a chain (not shown), to the conveyor 22 for driving the conveyor 22.

In the opertion of the miner, the cutter head cuts the coal from the mine face, and the platform 20 moves forwardly and scoops up the coal behind the cutter head. As the base plates 24 and associated bars 25 of the coal-gathering assembly 23 are rotated in the directions indicated by arrows in FIGS. 1 and 2, the coal is scooped into the pockets formed by the angularly adjacent pairs of bars 25. Upon continued rotation, the leading edge 32 of each bar 25 effectively and efficiently pushes the coal in its associated pocket onto the front end of the conveyor 22. Because the bars 25 are offset from the rotative axis and have the particular structural disposition described previously in detail, the coal is not only pushed laterally by the bars 25 onto the conveyor 22, but is urged laterally outward under centrifugal force in a direction substantially perpendicular to and along the entire leading edge 32 of each bar 25.

The loading of the coal onto the conveyor 22 by the rotating base plates 24 and bars 25 is continuous, and accordingly, any shock or impact forces on bearing means 35 and on conveyor 22 and its mountings are minimized so as to reduce any wear or damage to these parts, and thereby reduce any down-time of the miner for service and maintenance.

If the bearing means 35 does require service attention, access can be had to the bearing means 35 in the space between the associated and interconnected bars 25.

I claim as my invention:

1. A coal-gathering assembly, comprising:
   (a) a rotatively mounted base plate, and
   (b) a plurality of bars carried by the base plate, each bar extending across the base plate so that one bar end is adjacent the next angularly adjacent bar and that the other bar end extends beyond the periphery of the base plate, each bar including a leading edge facing in the direction of base plate rotation and extending substantially between its ends, and a trailing edge facing in the opposite direction and extending outwardly from the leading edge of the next angularly adjacent bar, said leading edge and said trailing edge being continuous for providing a substantially inwardly closed pocket that holds the coal and for pushing the coal laterally outward as the base plate rotates.

2. A coal-gathering assembly as defined in claim 1, in which:
   (c) the rotatively mounted base plate has a rotative axis inwardly of its periphery, and
   (d) each bar extends across the base plate intermediate the rotative axis and the base plate periphery, the leading edge extending on both sides of a radial reference line passed through the rotative axis and perpendicular to the leading edge.

3. A coal-gathering assembly as defined in claim 2, in which:
   (e) a bearing means rotatively mounts the base plate on the rotative axis and is located inwardly of and between the bars inside an enclosed space defined by the bars, the space being open for access.

4. A coal-gathering assembly as defined in claim 2, in which:
   (e) the trailing edge extends transverse to a radial reference line passed through the rotative axis and intermediate the ends of each bar, and
   (f) three bars are provided and arranged so that each angularly adjacent pair of bars is disposed in substantially one hundred and twenty degree relation.

5. A coal-gathering assembly for a continuous miner having a rotatable cutter means, a platform behind the cutter means, and a coal-transporting means adjacent the platform for delivering coal rearwardly of the miner, the assembly comprising:
   (a) a base plate rotatively mounted on the platform on each side of the coal-transporting means, and
   (b) a plurality of bars carried by each base plate, each bar extending across its associated base plate intermediate the rotative axis of the base plate and the base plate periphery, each bar having one end adjacent the next angularly adjacent bar and having the other end extending beyond the base plate periphery, each bar including a leading edge facing in the direction of base plate rotation and extending substantially between its ends, and a trailing edge facing in the opposite direction and extending outwardly from the leading edge of the next angularly adjacent bar, said leading edge and trailing edge being continuous for providing a substantially inwardly closed pocket for receiving and holding coal and for pushing the coal laterally outwardly of its associated pocket onto the coal-transporting means as the base plate rotates.

6. A coal-gathering assembly as defined in claim 5, in which:
(c) the said one bar end of each bar meets the angularly adjacent bar intermediate its ends to provide a two-sided pocket open at its periphery having one side longer than the other side, the leading edge extending between the bar ends, and extending on both sides of a radial reference line passed through the rotative axis and perpendicular to the leading edge, and the trailing edge extending transversely to the said radial reference line.

7. A coal-gathering assembly as defined in claim 6, in which:
(d) bearing means rotatively mounts the base plate to the platform, and
(e) the bars on each base plate are spaced laterally of the bearing means to provide an enclosed, top-open space for access to the bearing means.

8. A coal-gathering assembly as defined in claim 7, in which:
(f) three bars are provided and arranged with angularly adjacent bars in substantially one hundred and twenty degrees relation, and
(g) the enclosed, top-open space is defined by the bars providing an equilateral triangle.

9. A coal-gathering assembly comprising:
(a) a base plate rotatively mounted on a relative axis, and
(b) means carried by the base plate including a plurality of bars extending across the base plate in relative angular relation with one bar end of each bar extending beyond the periphery of the base plate, each bar including:
1. a leading edge facing in the direction of base plate rotation and extending inwardly of said bar end, the leading edge extending across the base plate intermediate the rotative axis and the base plate periphery, and
2. a trailing edge facing in the opposite direction and extending outwardly from the leading edge of the next angularly adjacent bar, the said leading edge and trailing edge meeting and being continuous for pushing the coal laterally outward as the base plate rotates.

* * * * *

UNITED STATES PATENT AND TRADEMARK OFFICE
CERTIFICATE OF CORRECTION

PATENT NO. : 4,231,468
DATED : November 4, 1980
INVENTOR(S) : DEMPSEY G. TUCKER

It is certified that error appears in the above-identified patent and that said Letters Patent are hereby corrected as shown below:

Column 6, Line 9, delete the word "relative" and substitute the word --rotative--.

Signed and Sealed this

Third Day of March 1981

[SEAL]

Attest:

RENE D. TEGTMEYER

Attesting Officer  Acting Commissioner of Patents and Trademarks